(12) United States Patent
Hideta et al.

(10) Patent No.: US 9,539,687 B2
(45) Date of Patent: Jan. 10, 2017

(54) TOOL HOLDER FOR CHIP SUCTION DEVICE AND MACHINE TOOL INCLUDING THE SAME

(71) Applicants: DMG MORI SEIKI CO., LTD., Nara (JP); FUJI JUKOGYO KABUSHIKI KAISHA, Tokyo (JP)

(72) Inventors: Morihiro Hideta, Nara (JP); Koji Sato, Nara (JP); Hisayuki Oide, Tokyo (JP); Shinya Matsuo, Tokyo (JP); Tatsuo Nakahata, Tokyo (JP)

(73) Assignees: DMG MORI SEIKI CO., LTD., Yamatokoriyama-shi, Nara (JP); FUJI JUKOGYO KABUSHIKI KAISHA, Tokyo (JP)

(*) Notice: Subject to any disclaimer, the term of this patent is extended or adjusted under 35 U.S.C. 154(b) by 681 days.

(21) Appl. No.: 13/950,254

(22) Filed: Jul. 24, 2013

(65) Prior Publication Data

US 2014/0027139 A1    Jan. 30, 2014

(30) Foreign Application Priority Data

Jul. 25, 2012  (JP) .................................. 2012-164434

(51) Int. Cl.
*B23Q 11/00* (2006.01)

(52) U.S. Cl.
CPC ..... *B23Q 11/0046* (2013.01); *B23Q 2220/008* (2013.01); *Y02P 70/171* (2015.11)

(58) Field of Classification Search
CPC .............. Y02P 70/171; B23Q 11/0046; B23Q 11/1092; B23B 2270/30; B23B 2270/62; B23D 59/006; B25D 17/20; B25D 2217/0065
USPC .................................................... 173/198, 199
See application file for complete search history.

(56) References Cited

U.S. PATENT DOCUMENTS 6,394,940 B1    5/2002   Sugata et al.

FOREIGN PATENT DOCUMENTS

| DE | 102007030858 A1 | 2/2008 |
|----|-----------------|--------|
| EP | 1203629 A1 | 5/2002 |
| JP | 11-262836 A | 9/1999 |
| JP | 3055019 B1 | 6/2000 |

OTHER PUBLICATIONS

Extended European Search Report for EP Application No. 13177788.0 dated Oct. 17, 2013. 3 pages.

*Primary Examiner* — Michelle Lopez
(74) *Attorney, Agent, or Firm* — IP Business Solutions, LLC

(57) ABSTRACT

A connection portion between a holder side part of a chip suction path and a main body side part of the chip suction path 12 is formed to have a non-contact structure, resulting in that not only a chip generated at a machining point but also a chip remained so as to be suspended in a machining atmosphere can be sucked and discharged.

8 Claims, 4 Drawing Sheets

TOOL HOLDER FOR CHIP SUCTION DEVICE AND MACHINE TOOL INCLUDING THE SAME

BACKGROUND OF THE INVENTION

1. Field of the Invention

The present invention relates to a tool holder for a chip suction device, and specifically to improvement in suction of chip in a machining atmosphere and in loadability with respect to a spindle.

2. Description of the Related Art

There is a chip suction device that includes an external suction-type suction path provided so as to pass through the outside of a tool holder and a spindle. In a case where this type of external suction path is provided, when the tool holder is loaded to the spindle, there is a need to connect a suction passage on the tool holder side and a suction passage on the spindle side in an air-tight state. In this case, there is a problem that the connection is not securely conducted if there remains a chip in a connection portion between the both passages.

Accordingly, in Japanese Patent Publication No. 3055019, a part on a tool holder side and a part on a spindle side of a suction passage are placed to face each other with a gap provided therebetween, in which either of the parts is formed so that it can be expanded/contracted to be deformed, and it is configured that when a value of suction negative pressure becomes a predetermined value or greater, the both parts are closely brought into contact with each other. Accordingly, by sucking a chip remained in a connection portion at a time of starting suction, it is possible to securely connect the both parts by preventing the chip from being sandwiched between the both parts.

SUMMARY OF THE INVENTION

Incidentally, in a machine tool including a chip suction device, it is of course demanded to suck and discharge a chip generated at a machining point, and in addition to that, it is also demanded to suck and discharge a chip or the like which is not sucked and remained so as to be suspended in a machining atmosphere. In order to meet the demand, in a conventional chip suction device, it is common that the chip generated at the machining point is sucked by using the suction device described in the aforementioned Patent Publication, and a dedicated suction device is separately provided for the chip suspended in the machining atmosphere. Therefore, since a plurality of suction devices are required, a cost of the devices is increased, which is a problem.

Further, in the conventional device, it is presupposed that the part on the tool holder side and the part on the spindle side of the chip suction path are closely brought into contact with each other, so that it becomes difficult to securely load the tool holder unless a dimensional accuracy of the both parts is highly maintained, which is also a problem.

The present invention is made in view of the above-described conventional situation, and a task thereof is to provide a tool holder for a chip suction device capable of sucking and discharging not only a chip generated at a machining point but also a chip remained so as to be suspended in a machining atmosphere, and capable of absorbing a displacement of a chip suction path when loading a tool holder to a spindle, and a machine tool including the same.

The present invention is a tool holder loaded to a machine tool including a chip suction device, the tool holder including a holder side part of a chip suction path of the chip suction device, in which a connection portion between the holder side part and a main body side part provided on a machine main body is formed to have a non-contact structure, and in a preferred embodiment, for example, the connection portion is configured by a downstream end of the holder side part and an upstream end of the main body side part with a gap provided therebetween.

According to the present invention, since the connection portion between the holder side part and the main body side part of the chip suction path is made to have the non-contact structure, namely, the gap is provided between the both parts as in the preferred embodiment, it is possible to suck the chip suspended in the machining atmosphere from the portion of the gap, and it is possible to realize suction and discharge of the machining atmosphere, even if a suction device dedicated to the suction of machining atmosphere is not separately provided.

Further, since the both parts are formed to have the non-contact structure, even if there is a displacement in the connection portion of the both parts when loading the tool holder to the spindle, the displacement can be absorbed by the gap, and accordingly, the dimensional accuracy of the connection portion of the both parts does not have to be increased very much.

In another preferred embodiment of the present invention, the tool holder is attachably/detachably loaded to a spindle of the machine tool by an automatic tool change mechanism, and the connection portion has a configuration in which the downstream end of the holder side part and the upstream end of the main body side part are placed to face each other with the gap provided therebetween in an axial direction of the spindle.

According to another preferred embodiment, since the downstream end of the holder side part and the upstream end of the main body side part of the chip suction path are placed to face each other with the gap provided therebetween in the axial direction of the spindle, even if there is a displacement in the axial direction, the displacement can be absorbed by the gap, resulting in that the tool holder can be loaded to the spindle more securely without increasing the dimensional accuracy of the both parts.

In still another preferred embodiment of the present invention, the tool holder side part of the chip suction path is formed from an inner part of the tool holder toward an outside in a radial direction, and then is formed toward the machine main body side.

According to still another preferred embodiment, since the chip suction path is formed from the inner part of the tool holder toward the outside in the radial direction, and then is formed toward the machine main body side, it is possible to easily and securely realize the configuration in which the gap is provided between the downstream end of the holder side part and the upstream end of the main body side part, at a portion toward the machine main body side.

Another invention of the present application is a machine tool including the tool holder for the chip suction device. According to another invention of the present application, since the tool holder for the chip suction device is provided, it is possible to suck the chip suspended in the machining atmosphere from the portion of the gap, and to realize suction and discharge of the machining atmosphere even if the suction device dedicated to the suction of machining atmosphere is not separately provided.

DETAILED DESCRIPTION OF THE PREFERRED EMBODIMENT

Figure 1:
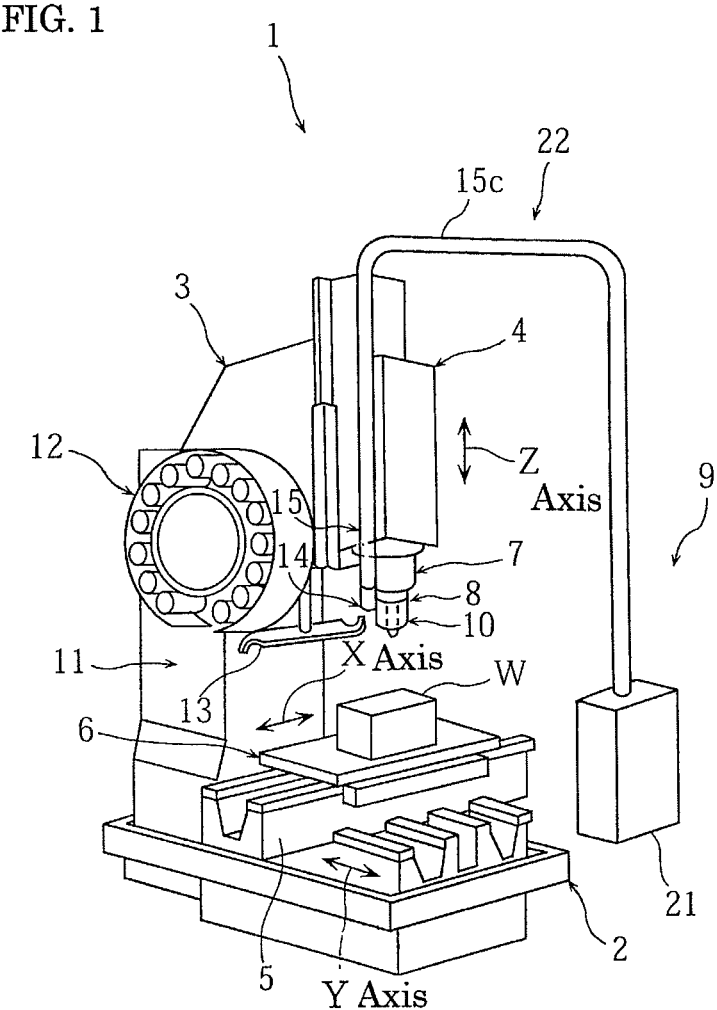
FIG. 1 is a front perspective view of a machine tool including a tool holder according to an embodiment 1 of the present invention.
Figure 2:
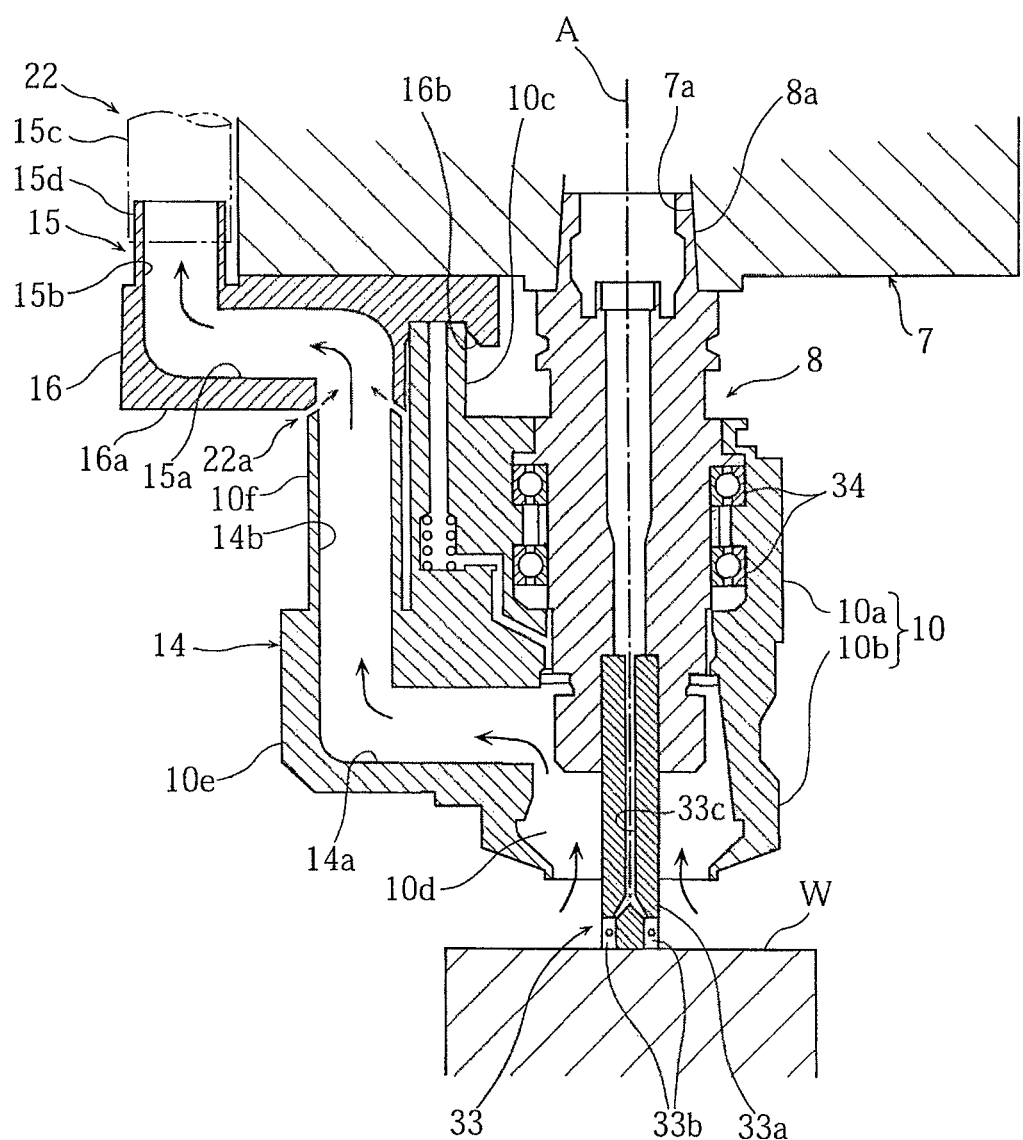
FIG. 2 is a front sectional view of the tool holder.
Figure 3:
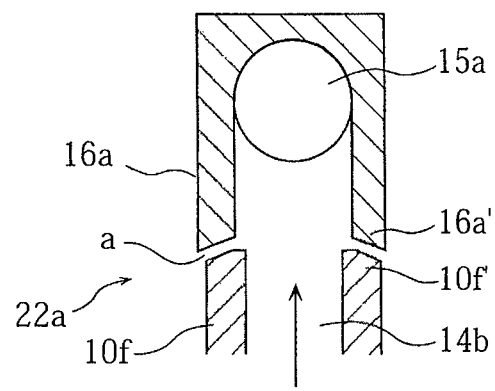
FIG. 3 is an enlarged sectional view of a connection portion of the tool holder.
Figure 4:
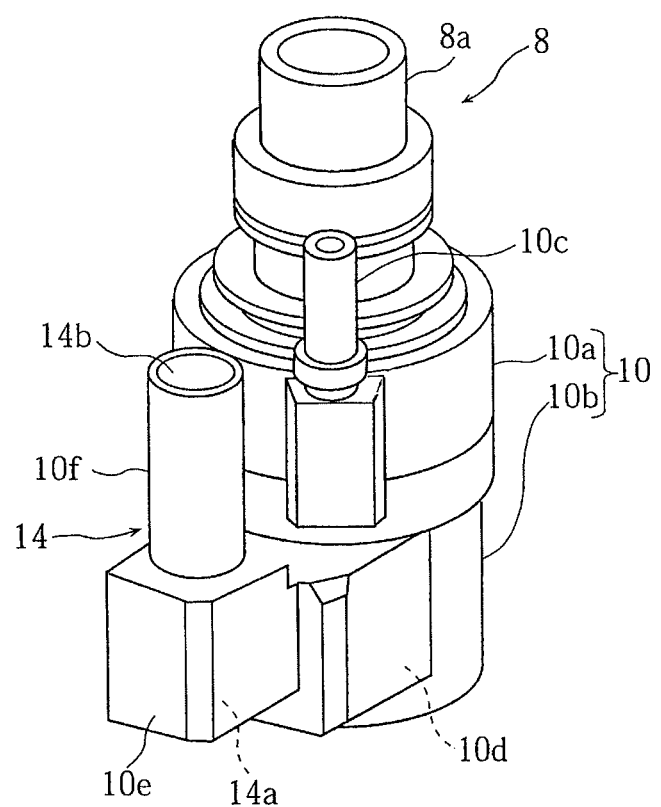
FIG. 4 is a front perspective view of the tool holder.

Hereinafter, an embodiment of the present invention will be described based on the attached drawings.

In the drawings, 1 denotes a machine tool including a tool holder for a chip suction device according to an embodiment 1 of the present invention. The machine tool 1 includes: a bed 2; a column 3 provided upright on a back portion of the bed 2, when seen from the front of the bed 2; a spindle head 4 supported on a front surface of the column 3 to be movable in an up and down direction (Z-axis direction); a saddle 5 supported on a front portion of the bed 2 to be movable in a back and forth direction (Y-axis direction); and a table 6 supported on the saddle 5 to be movable in a right and left direction (X-axis direction).

Further, on a side surface of the column 3, a tool changer 11 having a tool magazine 12, a tool change arm 13 and the like is disposed.

In the spindle head 4, a spindle 7 is inserted to be disposed and rotatably supported. Further, to a lower end portion of the spindle 7, a tool holder 8 is attachably/detachably loaded.

Further, the machine tool 1 includes a chip suction device 9. This chip suction device 9 includes: a suction cover 10 attached to the tool holder 8; a suction source 21 disposed on the outside of the machine; and a suction path 22 that connects the suction source 21 and the suction cover 10 in a communicable manner.

On a base end portion of the tool holder 8, a tapered portion 8a fitted to a tool fitting hole 7a formed on the lower end portion of the spindle 7 is formed, and a tool 33 is loaded to a tip portion of the tool holder 8. A cutting tool 33b is fixed to a tip of a main body portion 33a of the tool 33, and a suction hole 33c is formed in an axial center potion of the tool 33 so as to pass through the axial center portion.

Further, the suction cover 10 has: a base portion 10a supported to be relatively rotatable by the tool holder 8 via bearings 34; a cover portion 10b formed on a lower end portion of the base portion 10a to surround the tool 33 and to face a surface where a workpiece W is machined; and a rotation stopper 10c that prevents a rotation of the suction cover 10 by engaging with the spindle 7. The rotation stopper 10c is engaged with an engaging recessed portion 16b of a connecting tool 16 on which a main body side part 15 of a suction path 22 to be described later is formed.

The suction path 22 is configured by a holder side part 14 formed on the tool holder 8 side, and the main body side part 15 formed on the spindle 7 side.

The holder side part 14 has: a radial-direction suction hole 14a that is communicated with a suction chamber 10d formed by the cover portion 10b and is extending in the radial direction; and a connection hole 14b extending in a spindle-axis direction from the radial-direction suction hole 14a. The radial-direction suction hole 14a is formed in a holder-side suction portion 10e formed on the suction cover 10, and the connection hole 14b is formed in a connection portion 10f.

The main body side part 15 of the suction path 22 has: a connection hole 15a that extends a little in a direction of spindle axis A, and then extends in the radial direction; an axial-direction hole 15b that extends in the direction of spindle axis A from the connection hole 15a; and a suction hose 15c that connects the axial-direction hole 15b and the suction source 21. The connection hole 15a is formed in a connection portion 16a of the connecting tool 16 fixed to the lower end of the spindle 7, and the axial-direction hole 15b is formed in a hose connection portion 15d to which the suction hose 15c is connected.

A connection portion 22a between the holder side part 14 and the main body side part 15 of the suction path 22 is formed to have a non-contact structure. Specifically, a downstream end 10f' of the connection portion 10f on the holder side and an upstream end 16a' of the connection portion 16a of the main body side part are placed to face each other in the direction of spindle axis A with a gap "a" provided therebetween. Further, the downstream end 10f' is formed in a male tapered shape, and the upstream end 16a' is formed in a female tapered shape, resulting in that the gap "a" becomes an introducing passage introducing an outside air toward the downstream side.

Here, in a case where the tool holder 8 is loaded to the spindle 7, when the tool change arm 13 of the tool changer 11 grips the tool holder 8 to move it in the direction of spindle axis A, the tapered portion 8a of the tool holder 8 is fitted to the tool fitting hole 7a of the spindle 7, and the rotation stopper 10c is engaged with the engaging recessed portion 16b. After that, the tool holder 8 is pulled upward by a not-illustrated clamping mechanism, and is then clamped to the spindle 7.

At this time, the downstream end 10f' of the connection portion 10f of the holder side part 14 faces the upstream end 16a' of the connection portion 16a of the main body side part 15 with the gap "a" provided therebetween.

At a time of machining, the chip suction device 9 is activated, and a chip generated at a machining point is sucked in the suction source 21 from the suction chamber 10d via the holder side part 14 and the main body side part 15 of the suction path 22.

Meanwhile, the outside air is sucked in the suction path 22 from the gap "a" of the connection portion 22a, and accordingly, a chip remained so as to be suspended in the machining atmosphere, particularly in the vicinity of a portion at which the tool holder 8 is loaded to the spindle 7, is sucked from the gap "a" and sucked in the suction source 21 via the suction path 22.

As described above, in the present embodiment, the connection portion 22a between the holder side part 14 and the main body side part 15 of the chip suction path 22 is set to have the non-contact structure, namely, there is provided the gap "a" between the downstream end 10f' of the connection portion 10f on the holder side and the upstream end 16a' of the connection portion 16a on the main body side, so that a chip suspended in the machining atmosphere can be sucked from the portion of the gap "a", resulting in that the suction and discharge of the machining atmosphere can be realized even if the suction device for the suction of machining atmosphere is not separately provided. In this case, since the connection portion 22a is configured by the downstream end 10f' in the male tapered shape and the upstream end 16a' in the female tapered shape, the gap "a" functions as the introducing passage that smoothly introduces the outside air toward the downstream side, resulting in that an effect of sucking the outside air can be enhanced.

Further, the downstream end 10f' and the upstream end 16a' are formed to have the non-contact structure, so that when the tool holder 8 is loaded to the spindle 7, the dimensional accuracy of both of the ends does not have to be increased very much. Specifically, even when both of the ends are displaced in a direction perpendicular to the axis, the displacement can be absorbed by the gap "a", so that it is possible to prevent the occurrence of trouble in the connection of the suction path 22.

Further, since the downstream end 10f of the holder side part 14 and the upstream end 16a' of the main body side part 15 of the chip suction path 22 are placed to face each other in the direction of spindle axis A with the gap "a" provided therebetween, even if a displacement occurs in the axial direction, the displacement can be absorbed by the gap "a", resulting in that the tool holder 8 can be loaded to the spindle 7 more securely.

Note that in the present embodiment, since the suction hole 33c is formed in the axial center of the tool 33, it is also possible to configure an internal suction path, in addition to the external suction path. In this case, it is desirable to connect the internal suction path and the external suction path in the middle, and to provide a switching valve that brings either or both of the paths into operation.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A tool holder for a chip suction device being a tool holder loaded to a machine tool including the chip suction device, comprising
    a holder side part of a chip suction path of the chip suction device, wherein
    a connection portion between the holder side part and a main body side part provided on a machine main body of the chip suction path is formed to have a non-contact structure, and
    a cross-sectional center of the holder side part and a cross-sectional center of the main body side part match in an axial direction of the tool holder,
    the connection portion is configured by a downstream end of the holder side part and an upstream end of the main body side part with a gap provided therebetween,
    the downstream end of the holder side part is closer to a work to be machined than the upstream end of the main body side part to the work,
    the upstream end of the main body side part is tapered with an inner diameter increasing a size thereof as the chip suction path extends towards an upstream, and
    the downstream end of the holder side part is tapered with an outer diameter decreasing a size thereof as the chip suction path extends towards a downstream.

2. The tool holder for the chip suction device according to claim 1, wherein
    the tool holder is attachably/detachably loaded to a spindle of the machine tool by an automatic tool change mechanism; and
    the connection portion has a configuration in which the downstream end of the holder side part and the upstream end of the main body side part are placed to face each other with the gap provided therebetween in an axial direction of the spindle.

3. The tool holder for the chip suction device according to claim 2, wherein
    the tool holder side part of the chip suction path is formed from an inner part of the tool holder toward an outside in a radial direction, and then is formed toward the machine main body side.

4. The tool holder for the chip suction device according to claim 1, wherein
    the tool holder side part of the chip suction path is formed from an inner part of the tool holder toward an outside in a radial direction, and then is formed toward the machine main body side.

5. A machine tool including a tool holder for a chip suction device, the tool holder loaded to the machine tool including the chip suction device, the tool holder comprising:
    a holder side part of a chip suction path of the chip suction device, wherein
    a connection portion between the holder side part and a main body side part provided on a machine main body of the chip suction path is formed to have a non-contact structure, and
    a cross-sectional center of the holder side part and a cross-sectional center of the main body side part match in an axial direction of the tool holder,
    the connection portion is configured by a downstream end of the holder side part and an upstream end of the main body side part with a gap provided therebetween,
    the downstream end of the holder side part is closer to a work to be machined than the upstream end of the main body side part to the work,
    the upstream end of the main body side part is tapered with an inner diameter increasing a size thereof as the chip suction path extends towards an upstream, and
    the downstream end of the holder side part is tapered with an outer diameter decreasing a size thereof as the chip suction path extends towards a downstream.

6. The machine tool according to claim 5, wherein
    the tool holder is attachably/detachably loaded to a spindle of the machine tool by an automatic tool change mechanism; and the connection portion has a configuration in which the downstream end of the holder side part and the upstream end of the main body side part are placed to face each other with the gap provided therebetween in an axial direction of the spindle.

7. The machine tool according to claim 6, wherein
    the tool holder side part of the chip suction path is formed from an inner part of the tool holder toward an outside in a radial direction, and then is formed toward the machine main body side.

8. The machine tool according to claim 5, wherein
    the tool holder side part of the chip suction path is formed from an inner part of the tool holder toward an outside in a radial direction, and then is formed toward the machine main body side.

* * * * *